(12) United States Patent
Zhang et al.

(10) Patent No.: US 10,740,361 B2
(45) Date of Patent: Aug. 11, 2020

(54) CLUSTERING AND ANALYSIS OF COMMANDS IN USER INTERFACES

(71) Applicant: Microsoft Technology Licensing, LLC, Redmond, WA (US)

(72) Inventors: Yi Zhang, Bothell, WA (US); Claudio A. Aldana Rosenberg, Kirkland, WA (US); Kevin R. Beto, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 602 days.

(21) Appl. No.: 15/438,043

(22) Filed: Feb. 21, 2017

(65) Prior Publication Data
US 2018/0239496 A1    Aug. 23, 2018

(51) Int. Cl.
| | |
|---|---|
| *G06F 16/28* | (2019.01) |
| *G06F 11/34* | (2006.01) |
| *G06F 11/30* | (2006.01) |
| *H04L 29/06* | (2006.01) |

(52) U.S. Cl.
CPC ........ *G06F 16/285* (2019.01); *G06F 11/3072* (2013.01); *G06F 11/3438* (2013.01); *G06F 2201/865* (2013.01); *H04L 67/38* (2013.01)

(58) Field of Classification Search
CPC ............. G06F 3/0481; G06F 17/30598; G06F 3/1454; G06F 16/285; G06F 11/3438; G06F 11/3072; G06F 2201/865; H04L 67/38
See application file for complete search history.

(56) References Cited

U.S. PATENT DOCUMENTS

| | | |
|---|---|---|
| 6,195,622 B1 * | 2/2001 | Altschuler .......... G06F 16/9574 703/2 |
| 7,792,661 B1 | 9/2010 | Cooley et al. |
| 2002/0070977 A1 | 6/2002 | Morcos et al. |

(Continued)

OTHER PUBLICATIONS

Scarr, et al., "Improving command selection with CommandMaps", In Proceedings of the SIGCHI Conference on Human Factors in Computing Systems, May 5, 2012, pp. 257-266.

(Continued)

*Primary Examiner* — William L Bashore
*Assistant Examiner* — Gregory A Distefano
(74) *Attorney, Agent, or Firm* — Schwegman Lundberg & Woessner, P.A.

(57) ABSTRACT

Systems and devices for the evaluation and analysis of the usage of commands within user interfaces are disclosed. In an example, operations for clustering and analysis of commands performed in a user interface may include: processing data that identifies a set of commands used in a software application; identifying coordinated usage of respective commands of the set of commands; identifying clusters of commands based on the coordinated usage among the respective commands; defining associations within the clusters of commands based on relevancy, wherein the relevancy is determined for a respective cluster from clustering parameters such as a confidence value and a support level value; and identifying output features in the software application based on the clusters of commands. In a further example, the output features may include a presentation of a suggested command, or a change to a presentation of a user interface object.

14 Claims, 7 Drawing Sheets

FIG. 7

(56) References Cited

U.S. PATENT DOCUMENTS

| | | | | |
|---|---|---|---|---|
| 2008/0313633 | A1* | 12/2008 | Zhu | G06F 11/3466 718/100 |
| 2010/0107141 | A1* | 4/2010 | Fitzmaurice | G06F 3/0237 717/123 |
| 2010/0275138 | A1* | 10/2010 | Chang | G06F 11/3414 715/762 |
| 2013/0268888 | A1 | 10/2013 | Oshiro et al. | |
| 2013/0332423 | A1 | 12/2013 | Puri et al. | |
| 2014/0075336 | A1 | 3/2014 | Curtis et al. | |
| 2014/0089824 | A1* | 3/2014 | George | G06F 9/4451 715/762 |
| 2014/0282178 | A1* | 9/2014 | Borzello | G06F 9/453 715/771 |
| 2017/0010775 | A1* | 1/2017 | Grover | G06F 11/3438 |

OTHER PUBLICATIONS

Thorrtas, et al., "An Adaptive Environment for the User Interface of Excel", In Proceedings of the 1st international conference on Intelligent user interfaces, Jan. 4, 1993, pp. 123-130.

Napier, et al., "Knowledge of command usage in a spreadsheet program", In Journal of ACM SIGMIS Database: the Database for Advances in Information Systems; vol. 23, Issue 1, Mar. 1992, pp. 13-21.

Goodwin, et al., "Fuuctionality and Usability", In Magazine Communications of the ACM, vol. 30, Issue 3, Mar. 1987, pp. 229-233.

Iglesias, et al., "Creating Evolving User Behavior Profiles Automatically", In Journal of IEEE Transactions on Knowledge and Data Engineering, vol. 24, Issue 5, May 2012, pp. 1-14.

Nichols, et al., "Automatic Interface Generation and Future User Interface Tools", In Proceedings of ACM CHI Workshop on the future of user interface design tools, Apr. 5, 2005, 2 pages.

Tan, Xian, "Number Cruncher:- introduction to Microsoft 2007", https://www.google.co.in/url?sa=t&rct=j&q=&esrc=s&source=web&cd=1&ved=0ahUKEwjy7cuKx4TRAhVHN48KHWdaBNAQFggbMAA&url=http%3A%2F%2Fzenportfolios.com%2Fyuyan%2Ffiles%2F2009%2F11%2Fintroduction-to-microsoft-2007-by-tan-xian.docx&usg=AFQjCNFWPrSsNtoDP79fKhbQ_7p3lgcOuQ&sig2=Re_4N8i1eFDhswYNfb1u1A&cad=rja, Published on: Oct. 25, 2009, 32 pages.

"Apriori algorithm", https://en.wikipedia.org/wiki/Apriori_algorithm, Published on: Dec. 1, 2016, 5 pages.

Borgelt, Christian, "FP-growth—Frequent Item Set Mining", http://www.borgelt.net/fpgrowth.html, Published on: Oct. 15, 2016, 2 pages.

* cited by examiner

| Size | Category |
|---|---|
| 167306 | InsNewPage AutoFormat SxPivotField SxFields Edit Insert |
| 129747 | ColWidth Outline CeCalcOptions |
| 96789 | Sort Lock ToggleProt |
| 86550 | 16872 CeFormatCellBorders 16429 MergeCells |
| 85503 | CeRowHeight CeClearOutline DefineStyle |
|  | CeEnableObj CeLblProp CeRunObjDialog CeBtnPropSelSpecial On Window CeSelListItem CeListProp |
| 78660 | CePushBtnProp CeDelListItem |
| 72504 | FmtDefineStyle Currency DropBtn |
| 31033 | SxWizard CeEzFilter |
| 28666 | SubordinateMode Print PrintSetup |
| 28526 | ActivateClearTableStyles SourceDataChart ChartDataGridEditFull Unhide |
| 28499 | CeRenameObj Hide |
| 23133 | CetoggleAuditMode CeDisplayOptions ToggleFmlabar FullScreen |
| 21741 | FillUp FillDown |
| 15539 | OnDouble OnKey MacroOpt |
| 15143 | WorkbookProtect WorkbookHide WorkbookUnhide |
| 14883 | SxDrillDown Promote Demote ExpandCollapse |
| 12445 | HscrollThumb DoSize VScrollThumb |
| 10279 | ColHide ColUnhide 16431 |
| 10162 | SortCellCIrOnTop SortDescending SortAscending |
| 8580 | ClearPrintArea PrintArea |
| 8092 | InsertObject CePaneSplit CeGeneralOptions FreezePane |
| 7731 | HscrollLine VScrollPage HScrollPage |
| 5446 | CeMoveBrk Layout Normal |
| 4533 | SxRefreshView sx12Source RefExtData |
| 2557 | sx12NewPivot SxGrandTotalsOffRC SxSubTotalsOff SxOpt |
| 1608 | DeleteNote CeClearNotes |

*FIG. 5*

CLUSTERING AND ANALYSIS OF COMMANDS IN USER INTERFACES

BACKGROUND

Commands are initiated by users in computing systems to perform functions or operations in a variety of software applications. Many different types of inputs may be received and processed by a computing system to activate, specify, or control commands. For instance, commands may be initiated by users as a result of graphical user interface cursor selections, gestures, keyboard inputs, buttons or control device indications, and the like. The commands that may be invoked in a software application can range from simple commands such as opening a data file, selecting a graphical object, or copying and pasting text, to complex commands such as performing multiple computational functions, applying formatting to specified graphical objects or areas, and the like.

Software applications such as web browsers, spreadsheet programs, or word processing programs may include hundreds or even thousands of different types of simple and complex commands. Many of these commands are not used by lower-skill users, unless specific training for the use of the command or the software application is provided to the user. As a result, many users are unable to perform desired actions, or perform actions in a software application in a more manual or complicated manner than would be available from complex commands. Further, even with training, some users may not remember or fully understand how to access, perform, or repeat certain commands.

SUMMARY

Various details for the embodiments of the inventive subject matter are provided in the accompanying drawings and in the detailed description text below. It will be understood that the following section provides summarized examples of some of these embodiments.

Embodiments described herein generally relate to the execution and operation of software applications on computing devices and in particular, to the processing and analysis of multiple commands in software applications occurring within user interfaces and user-controlled scenarios. In an example, embodiments may include electronic operations that: process data that identifies a set of commands used in a software application; identify coordinated usage of respective commands of the set of commands; identify a cluster of commands based on the coordinated usage among the respective commands of the set of commands; define associations within the cluster of commands based on relevancy, where the relevancy is determined for a respective cluster from clustering parameters such as a confidence value and a support level value; and identify an output feature in the software application based on the cluster of commands.

In a further example, the set of commands used in the software application are invoked by interaction from a human user received in a user interface of the software application. Also in a further example, the electronic operations may further exclude commands of the software application that are used above a predefined frequency. Also in a further example, the identified output feature in the software application includes a presentation of a suggested command, or a change to a presentation of a user interface object, in response to the cluster of commands. Also in a further example, a display of the software application is updated, based on the identified output feature.

An embodiment discussed herein includes a computing device including processing hardware (e.g., a processor) and memory hardware (e.g., a storage device or volatile memory) including instructions embodied thereon, such that the instructions, which when executed by the processing hardware, cause the computing device to implement, perform, or coordinate the electronic operations. Another embodiment discussed herein includes a computer program product, such as may be embodied by a machine-readable medium or other storage device, which provides the instructions to implement, perform, or coordinate the electronic operations. Another embodiment discussed herein includes a method operable on processing hardware of the computing device, to implement, perform, or coordinate the electronic operations.

As discussed herein, the logic, commands, or instructions that implement aspects of the electronic operations described above, may be provided in a client computing system or a server computing system, including any number of form factors for the computing system such as desktop or notebook personal computers, mobile devices such as tablets, netbooks, and smartphones, client terminals and server-hosted machine instances, and the like. Another embodiment discussed herein includes the incorporation of the techniques discussed herein into other forms, including into other forms of programmed logic, hardware configurations, or specialized components or modules, including an apparatus with respective means to perform the functions of such techniques. The respective algorithms used to implement the functions of such techniques may include a sequence of some or all of the electronic operations described above, or other aspects depicted in the accompanying drawings and detailed description below.

This summary section is provided to introduce aspects of the inventive subject matter in a simplified form, with further explanation of the inventive subject matter following in the text of the detailed description. This summary section is not intended to identify essential or required features of the claimed subject matter, and the particular combination and order of elements listed this summary section is not intended to provide limitation to the elements of the claimed subject matter.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 5 illustrates a table representing usage of clustered commands, according to an example.

DETAILED DESCRIPTION

Figure 1:
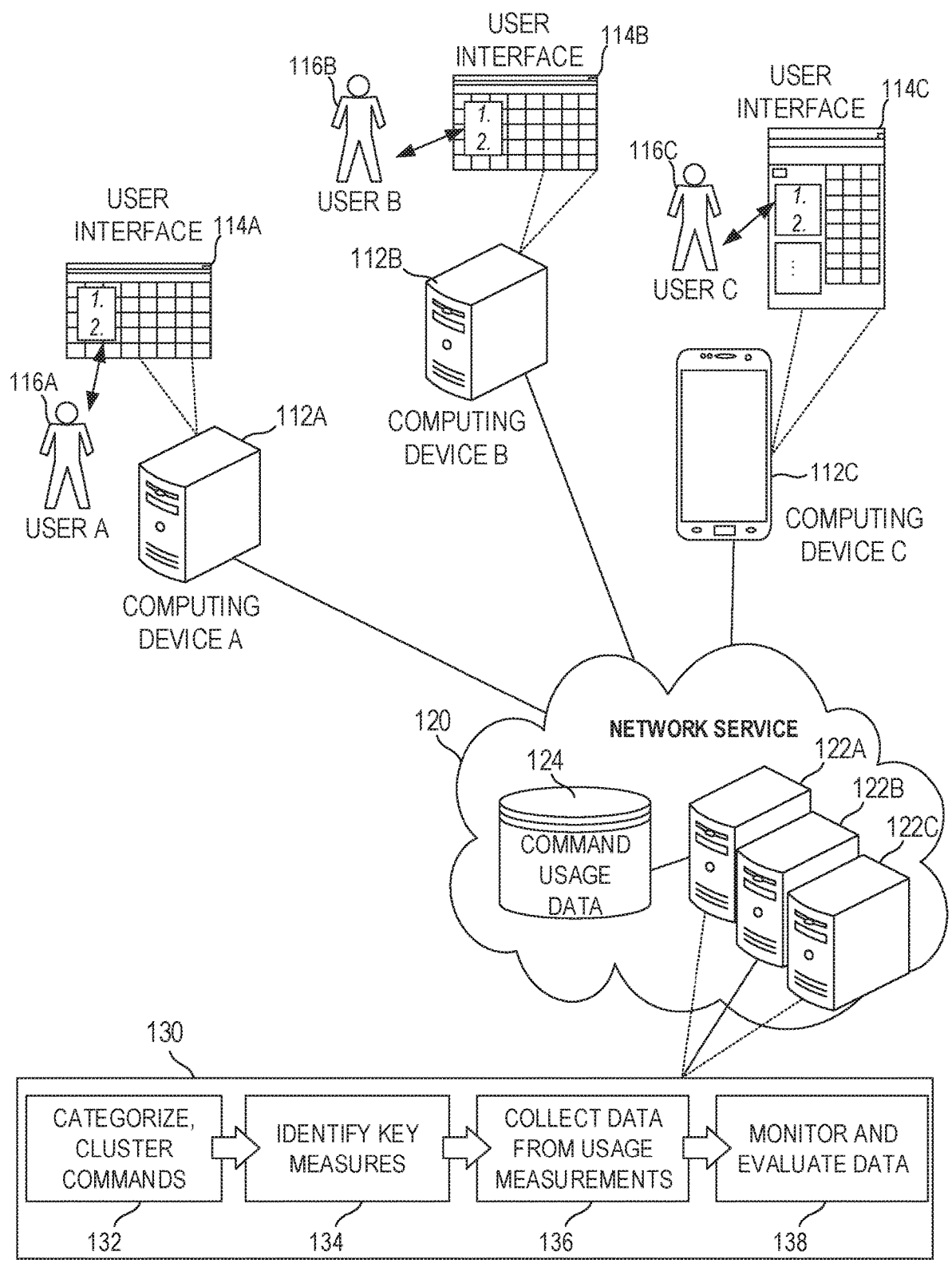
FIG. 1 illustrates an example scenario for usage and evaluation of commands in user interfaces of respective computing devices, according to an example.

In the following description, methods, configurations, and related apparatuses are disclosed for analyzing usage of functions commands in a software application. These techniques may be used to analyze a set of application functions and commands that are invoked or used together. This technique may be used to cluster the commands invoked for a client application, to identify and generate sets ("bucket") of feature areas that are commonly used together for a software application. The identification of such feature areas may result in improved analysis of complex use cases and scenarios that involve multiple commands, in contrast to existing approaches that merely emphasize the popularity or sequence of a single command.

Some of the mechanisms that are used to receive and activate commands from human users in user interfaces include menus, input boxes, keyboard shortcuts, buttons and other graphical user interface controls, and the like. Software applications, such as productivity software or web browsers, may include hundreds or even thousands of different selectable commands, from simple actions (e.g., navigate back/forward in a web browser) to complex, contextual-specific actions (e.g., to invoke a data manipulation function followed by a data visualization function). As a result of the extensive number of commands, a proficiency level may vary significantly among different users, from novice users who may invoke only commonly performed commands such as copy-and-paste, to advanced users who may invoke complex combinations of functions and commands.

In the following examples, analysis of the commands may include the application of mechanisms that determine how commands are clustered based on usage data, including the usage of processing algorithms and graphs identify strong relationships between commands within a cluster. In an example, the algorithm for determining command clustering includes an analysis of calculating distances between commands in a graph representation. In further examples, new functions may be created based on the clustering determination, and feedback may be provided to the user for new functions based on the clustering determination. This may result in identifying unique and customized approaches to present information in a visual manner, such as presenting new or related user interface functions to the users, modifying a user interface dynamically based on the clustering determination, customizing a user interface according to expected actions for the type of user or the type of work being performed, among other capabilities.

Software applications such as web browsers, office productivity applications (e.g., word processors, spreadsheets, presentation, note taking applications), enterprise software applications, and the like are often very complicated software applications. Due to the thousands of available functions embedded in a software application, there are an enormous number of ways that individual users can operate the software. The techniques discussed herein attempt to analyze the user engagement based on the particular commands and scenarios that are performed, through the use of a model which observes and emphasizes the set of commands that are executed together in a time and operational relationship. The outcome of the model may be used for identifying the key feature areas in the software, which can be used to capture, analyze, and improve user inputs around such feature areas.

Other approaches for analyzing usage of commands have involved the limited analysis of a single command or a class of commands, typically in isolation, to identify the most commonly used functions and features invoked by users. A related area of research includes the design and rearrangement of command controls (e.g., menus, buttons, input fields) in graphical user interfaces to improve access to the most commonly used functions. The techniques discussed herein extend beyond the analysis of a single command or even class of commands, to analyze multiple commands provided in sequences of commands, relationships between commands, and other aspects of clustered commands and multiple invoked functions.

FIG. 1 provides an overview of an example scenario for usage and evaluation of commands in user interfaces of respective computing devices. As illustrated in FIG. 1, computing devices 112A, 112B, 112C execute respective software applications to output user interfaces 114A, 114B, 114C that are operated respectively by users 116A, 116B, 116C. The users 116A, 116B, 116C provide multiple commands to the user interfaces 114A, 114B, 114C through various input forms, such as cursor, keyboard, or touchscreen inputs. (The various forms of available input devices and output devices are not directly illustrated in FIG. 1, as it will be understood that the techniques discussed herein are not limited to any particular form of user input or digital output).

In an example, the software applications that output the user interfaces (e.g., user interface 114A, 114B) are provided from the same version of the software applications, or are hosted among computing devices of the same platform or type (e.g., computing devices 112A, 112B which may be PCs). In a further example, some of the software applications that output the user interfaces (e.g., user interface 114C) are provided from another version of the software application or that is hosted by a different platform or type of device (e.g., computing device 112C which may be a mobile device). The commands that are invoked by the respective users 116A, 116B, 116C, in the respective user interfaces 114A, 114B, 114C, however, may involve the same or substantially similar commands.

As also shown in FIG. 1, the respective computing devices 112A, 112B, 112C are communicatively coupled (e.g., over a network) to a network service 120 operating a plurality of servers 122A, 122B, 122C. In an example, the data or instructions for operation of the user interfaces 114A, 114B, 114C are provided from the network service as a cloud-hosted service. In another example, the data and instructions for the user interfaces 114A, 114B, 114C are locally hosted and executed by the respective computing devices 112A, 112B, 112C, but information on the usage of the commands is collected and communicated to the network service 120. The network service 120 may store a copy of the collected usage data in a command usage database 124 or in a like data store.

The network service 120 may utilize the processing servers 122A, 122B, 122C to collect and evaluate command usage information provided from client usage of commands in the respective user interfaces 114A, 114B, 114C, for one or multiple types of software applications, software application versions, and on behalf of individual clients, groups of clients, or all users. In an example, the processing servers 122A, 122B, 122C coordinate a sequence of processes 130 that emphasize the following data flow: first, categorization and clustering of user interface commands (process 132); the identification of key measures for software functionality from the clustered and categorized user interface commands (process 134); the collection of data from usage and measurements of real-world deployments of the software (process 136); and the monitoring and evaluation of usage and measurement data from the real-world deployments of the software (process 138), including the monitoring and evaluation of any user interface enhancements or changes made in response to the usage and measurement data. Further processing actions that are not expressly depicted in processes 130 may include the implementation and deployment of user interface enhancements or changes (e.g., made in response to the usage and measurement data) such as customization for certain types or groups of users.

In an example, various forms of command usage data are captured as a user conducts operations inside a software application. The command usage data may be created from the usage of commands, triggered by mouse clicks on user interface entry points (e.g., a command ribbon, a context menu, a command flyout, etc.), typing in the user interface (e.g., as the user types content in a document, in a contextual "Tell Me" box, in a help interface, in a search box, etc.), or even keyboard shortcut keys.

In an example, the execution of each user-invoked command triggers recording in a database row, with the sequence information indicating execution order. The type of information that is captured from a user-invoked command may also include a session identifier that can be associated with session metadata or a user's profile, such as to identify which user, what license, what kind of device and app, what operating system version, what application version, and the like. In this way, command ownership, usage, and relationships can be tracked.

As discussed in the following examples, commands and clusters of commands for a software application may be organized into categories based on how users actually interact with the product, instead of an arbitrary top down definition based on expected use cases. The clusters of commands may be established from the application of a clustering algorithm, which identifies how often two or more commands occur together in a given timespan or scenario.

Figure 2:
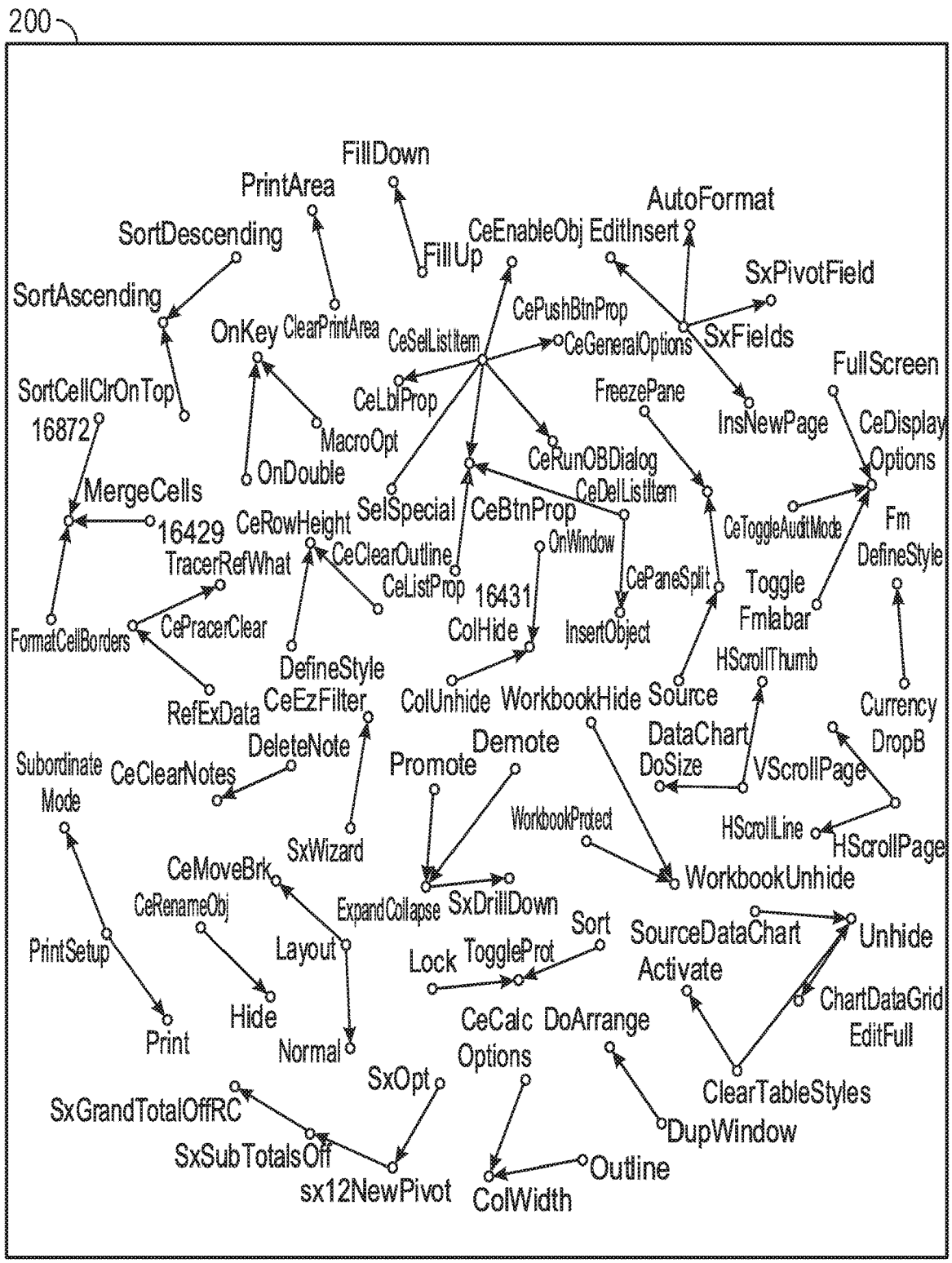
FIG. 2 illustrates a representative associative graph of commands, generated for functions of a spreadsheet application, according to an example.

The concept of clustering and usage patterns for a particular user may be visualized and represented with the use of an associative graph. Specifically, FIG. 2 illustrates a representative associative graph of commands 200, provided for functions of a spreadsheet application according to an example. In the associative graph of commands 200, various relationships between commands invoked by user actions in the spreadsheet application are shown.

The graph of commands 200 represents commands as nodes, and edges between commands A and B represents the fact that often after command A is invoked, command B will be invoked. The distance between the nodes (e.g., the length of the edges) is representative of the frequency of the particular command being invoked. For example, a small distance between connected nodes A and B but a larger distance between connected nodes A and C may represent that command B is invoked more often than command C.

The respective clusters can be identified by sets of commands (e.g., nodes in the graph) that are connected to each other but not to other commands (e.g., are separated from other nodes in the graph). For example, a first cluster may be identified from the selection of commands that cause certain display options in the spreadsheet application; another cluster may be identified from the selection of PivotTable view options; another cluster may be identified from a sequence of chart creation actions; another cluster may be identified from the use of external data, and the like.

The graph of commands 200 is shown as a result of operations occurring in an example use scenario, generated with a confidence level of 30% and a popularity level (support) of 0.02%. The confidence level of 30% means that commands have at least a 30% chance of occurring together in a particular session; and the popularity level of 0.02% means that commands that are less popular than 0.02% across all sessions will not appear in the final graph. For example, the associative graph of commands 200 depicts commands performed by users in a user scenario in the MICROSOFT® EXCEL® software application, with commands of the spreadsheet application being linked according to usage among multiple users and instances of the spreadsheet application.

The data used in the graph of commands 200 shows the results of grouping the commands for the commands in which the distance exceeds a confidence level. In an example, a confidence level is used as a threshold for defining the clustering, with the confidence level being used to determine whether the two commands should be grouped together or not. However, the size of the group (e.g., the number of commands connected in a cluster) does not necessarily represent the popularity of the group. In further examples, confidence levels may be set lower to capture more groups of commands and thus more clusters; confidence levels may be set higher to capture fewer but stronger groups and clusters of commands.

Figure 3:
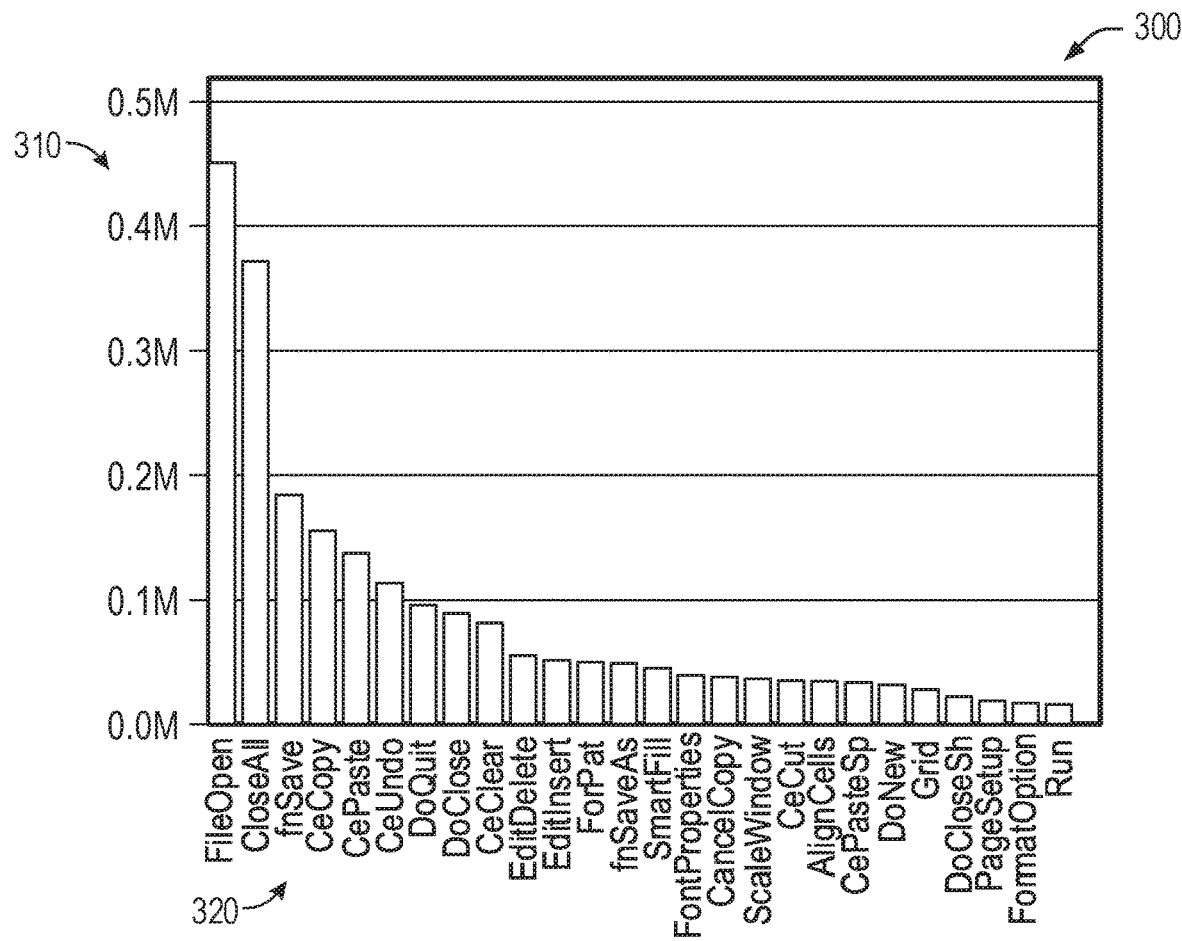
FIG. 3 illustrates a graph representation of frequency usage of commands used for filtering high frequency commands, according to an example.

In an example, the clustering of commands may be performed to exclude certain commands, such as high frequency commands or internal commands that are not directly triggered by an action of the user. FIG. 3 illustrates a graph representation 300 of the frequency usage of commands in a scenario, used for filtering high frequency commands according to an example.

Specifically, FIG. 3 depicts the frequency of commands launched in the MICROSOFT® EXCEL® software application, portraying a first axis 310, identifying frequency, as compared with a second axis 320, identifying respective commands. As shown in the results of the graph representation 300, various high frequency commands may be identified, such as: FileOpen, CloseAll, fnSave, CeCopy, CePase and CeUndo. Each of these high frequency commands may be excluded from clustering and analysis, such as based on a threshold or to exclude a certain number of high frequency commands.

Figure 4:
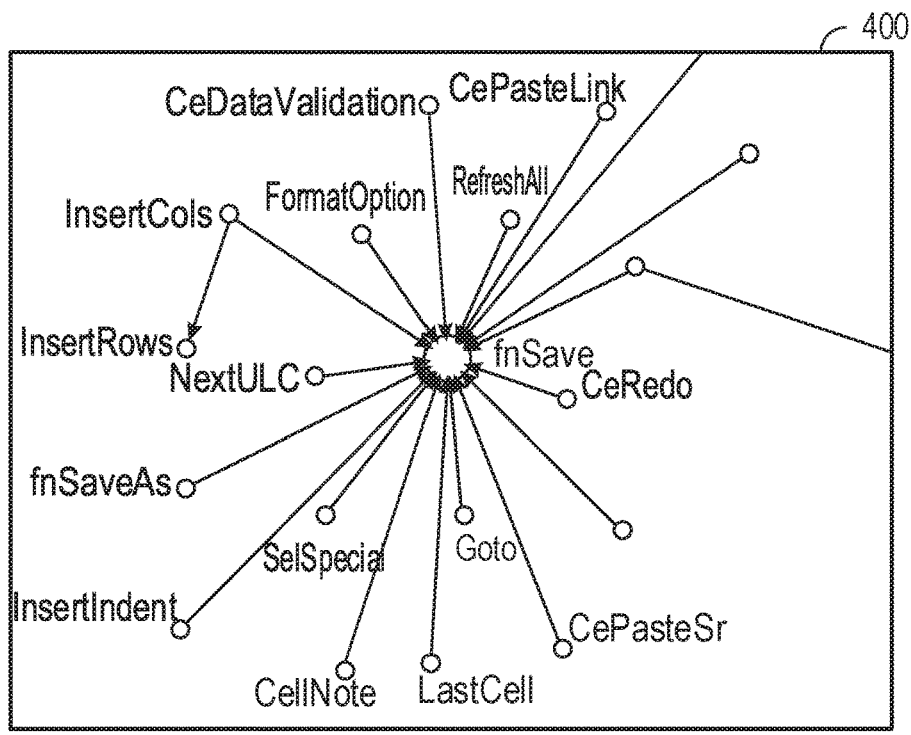
FIG. 4 illustrates a representation of command-centered clustering provided for a function, according to an example.

FIG. 4 illustrates an example representation 400 of command-centered clustering provided by a function. Specifically, relationships of commands to a high frequency command for a file "save" in the MICROSOFT® EXCEL® software application, fnSave, is illustrated in the representation 400. As shown, the fnSave command cluster relates fnSave with multiple unrelated commands, which is a typical outcome given that a user is likely to invoke the save function in addition to other commands within a certain time period (e.g., 10 minutes). Further, the save function operates as a shared application feature and is not particular to a specific category of operational functions within the software application, and may be excluded on this basis. The linking of commands for lower-frequency commands may be clustered and filtered based on similar considerations.

A graph or other linking data structure used for clustering may be refined iteratively, each time excluding additional nodes that associate multiple unrelated commands, or very frequent commands like Paste, Undo and Copy that are naturally correlated with use of the software application and not a specific feature or command set. By excluding such frequent commands, more precise categories and clusters of commands can be generated and refined. In a further example, automation may be used to automate the refinement process by excluding graph nodes by using grades or scores for a function, to require a grade or score greater than a threshold.

In an example, the clusters may be generated and updated automatically without human interaction except for human oversight or guidance for inputs such as: definition or selection of the list of commands to be excluded; definition or selection of a cutoff (threshold) confidence level; or definition or selection of a cutoff (threshold) support level. For instance, if the association between commands A and B is denoted as A→B, then intuitively two commands have a strong association if they often happen in the same interaction with the product. Commands Copy and Paste are also examples of commands that are expected be related together, and after a Copy and Paste the user probably will apply a Format to the pasted cell. The measure of this association is the ratio between the frequency of both commands A and B appearing together and frequency of A.

FIG. 5 illustrates an example table 500 representing clustered commands. The table 500 for clustered commands is depicted including data for cluster categories 520, which is ranked or ordered based on size values 510. The size values 510 are produced from a numerical occurrence of the particular clusters in an example scenario, such as produced from a monitored scenario of thousands of uses of the software application from among thousands of users. As shown, some of the cluster categories 520 include as few as two correlated commands; whereas other of the cluster categories include five or more commands. In an example, the cluster categories 520 may be further segmented by a particular sequence of commands, whereas in other examples the cluster categories may be segmented by any sequence of commands.

Figure 6:
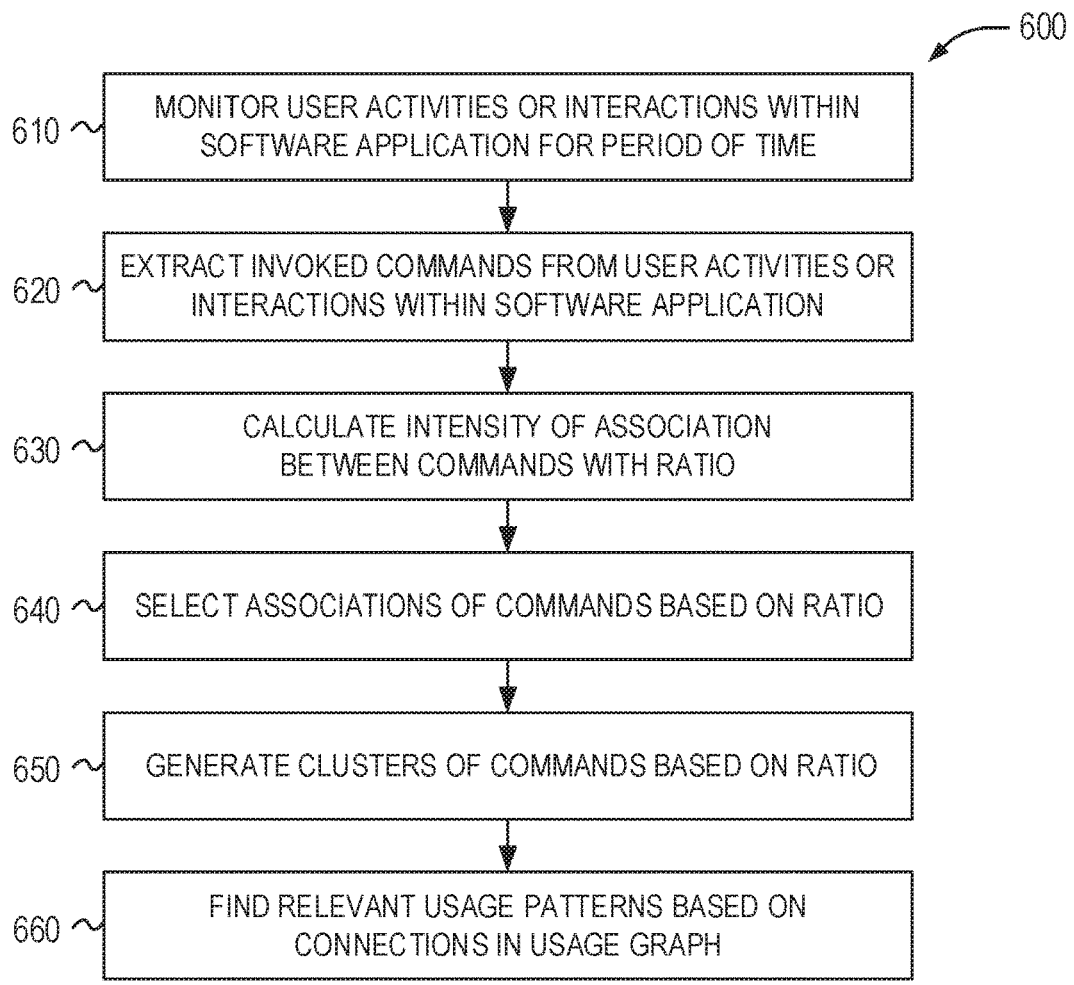
FIG. 6 illustrates a flowchart of example operations for identifying and processing commands for clustering, according to an example.

FIG. 6 illustrates a flowchart 600 of example operations for identifying and processing commands for clustering. The actions implemented from the operations of the flowchart 600 may be described with the following sequence.

First, monitor user activities or interactions within a software application, for a period of time (operation 610). This is followed by operations that extract invoked commands from user activities or interactions within the software application (operation 620). The extraction may include, for each session of the software application, obtaining data for activities or interactions that are initiated by a user. For instance, a fixed window or interval of time may be considered an interaction, and for each fixed window or interval, data may be collected and extracted for an array of commands that are invoked.

Next, calculate the intensity of association between each pair or set of commands (operation 630). For example, an association between a pair of commands A→B, may be calculated with a ratio, expressed by the numerator defining the number of times both commands A and B appear in an activity, and the denominator defining the number of times that command A appears individually in the activity. Using a greedy algorithm, a selection of the most relevant associations of commands may be performed (and ranked) based on the ratio (operation 640). The selection of the most relevant associations (e.g., most highly ranked based on the radio) may be used to generate respective clusters of commands (operation 650).

The clusters of commands and the associations may be represented in a usage graph or like associative data structure that is represented in a computing system. Relevant usage patterns may be located or identified within the connections of the usage graph (operation 660). For instance, for each command association identified in the association actions above, a new edge may be added to the graph connecting the subject commands. In a further example, the data may be analyzed based on time periods of data (e.g., multiple weeks, multiple months), such that one or more set of command chunks are extracted for each user interaction session.

Figure 7:
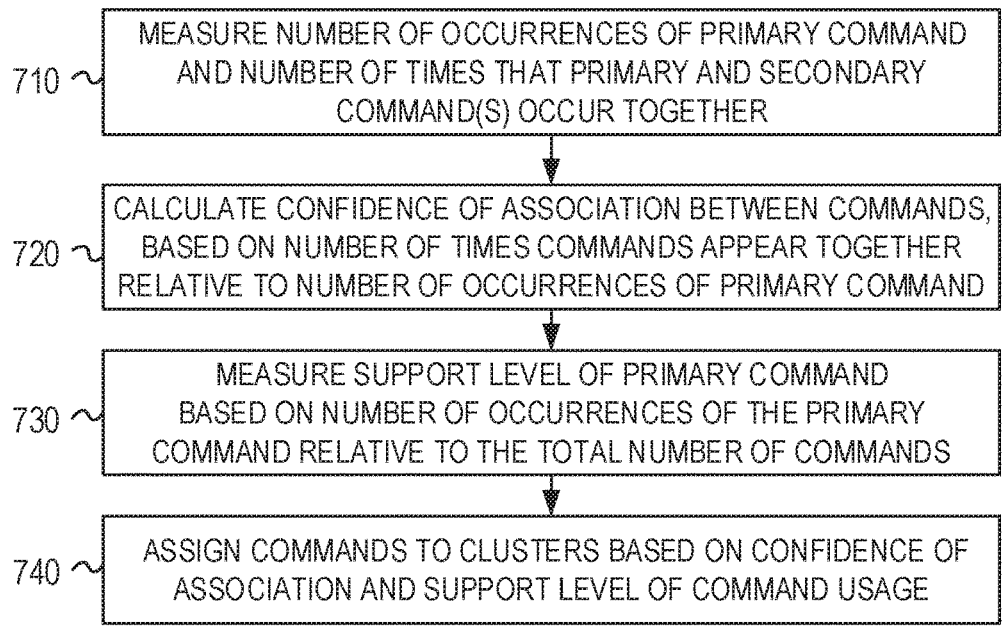
FIG. 7 illustrates a flowchart of operations for clustering commands, according to an example.

FIG. 7 illustrates a flowchart 700 of example operations for clustering commands. In an example, results for clustering two (or more) commands are controlled as a result of a calculated distance between the two commands, which is produced from how often they appear together in a session. For instance, clustering of commands may be performed with operations that measure the number of total occurrences of a particular command (a primary command), and the number of times that the occurrence of particular command is accompanied by an occurrence of another command (a secondary command) (operation 710). This distance may be produced in a model that defines the notion of association between two commands based on the relative occurrence of both commands in an activity.

Similar approaches for determining an association between items have been applied in other research areas, such as basket shopping analysis that is used to identify which products a consumer may buy together. For example, if cola soft drinks and tortilla chips appear in the same transaction frequently, relative to the total number of cola soft drink purchases, then it can be concluded that there is a strong association between cola soft drinks and tortilla chips. In a similar fashion, the confidence of association between two software application commands may be measured based on the number of times that the commands appear together (e.g., that use of the particular command is accompanied by use of another command) relative to the occurrence of the particular command (operation 720). The calculations and categorizations may be employed in a model as follows:

c(i, j): Measures the confidence of association between two commands, $CID_i$ (the primary command) and $CID_j$ (the secondary command):

$$c(i, j) := \frac{\text{Number of times both commands } CIDi \text{ and } CIDj \text{ appear together}}{\text{Number of occurrences of } CIDi}$$

The relationship between the commands may be further evaluated with respect to a support level for a particular command (the primary command) relative to the total number of commands (operation 730). In an example, a support level s(i): measures the support level of a command, $CID_i$ as:

$$s(i) := \frac{\text{Number of occurrences of } CIDi}{\text{Total number of commands}}$$

With the definition of the confidence and support level for a particular command, one or more clusters for the particular command may be defined from command usage (operation 740). In terms of the confidence of association ($c(i, j)$) and the support level ($s(i)$), the following pseudo code may be used to illustrate a process to assign respective commands to a cluster. In the following example, all the commands will not necessarily be classified to an assigned cluster; rather, only those participating in a relevant association will be classified to an assigned cluster.

```
void AssignCommandsToClusters(c(i,j): matrix of associations,
c: min confidence, s: min support level, cluster:mapping
between CIDi and cluster id)
    Order the associations c(i,j) in decreasing confidence
level;
    Filter association with c(i,j) < c or s(i) < s;
    For each association c(i,j):
        If Cluster[j] is null then
            If Cluster[i] is not null then:
                Cluster[j] <-- Cluster[i];
            Else:
                Create new cluster k;
                Cluster[i] <-- Cluster[j] <-- k;
        Else:
            If Cluster[i] is null then:
                Cluster[i] <-- Cluster[j];
    Return;
```

Other distance measurements may be used to obtain different variations of results. In an example, the techniques discussed above may be further modified by approaches involved with an Apriori algorithm or a FP-Growth algorithm. With an Apriori algorithm, frequently occurring items are identified and used to identify general trends and relationships in data. With a FP-Growth algorithm, frequent patterns may be identified by pattern fragment growth, and represented in a frequent pattern tree.

In further examples, the usage of the cluster modeling and analysis may be used to expand to analysis of vertical feature areas (e.g., usage clustering for specific features such as formula usage, or chart features); or to horizontal feature areas (e.g., to apply a model to determine customer profiling, and to categorize usage based on such customer profiling). In this fashion, the techniques discussed herein are not limited to visibly-invoked user interface commands, but also to other aspects of usage of the software application.

In an example, the clustering techniques discussed above may be used to group or categorize commands into different groups, which can be subsequently later used in measuring user engagement, segmentation, and the like. For instance, users and types of users (e.g., service businesses, universities, etc.) may be segmented using the categories of clusters that are identified. This may result in changes to the user interface that allow certain feature sets to be hidden, activated, made more prominent, presented at different times, etc., based on a grouping.

Users may be segmented to allow customization of feature sets based on usage of certain clusters of commands in particular areas. For example, suppose a first organization, Organization A, involves use of commands as follows: data analysis (100 percent usage), sharing/collaboration (15 percent usage), programmability (28 percent usage), visualization (20 percent usage). Organization A may be classified as calculation and data analysis savvy. This may differ from a second organization, Organization B, which uses commands as follows: data analysis (30 percent usage), sharing/collaboration (80 percent usage), programmability (28 percent usage), visualization (100 percent usage). Organization B will be collaboration and visualization intensive.

In an example, available software application features and feature sets may be customized based on the classification of a user, produced from what cluster of commands that the user, a group of users, or similar users invoke. This may provide more accurate feature matching as compared with categorizing a user or all users of an enterprise into a fixed skills category (e.g., limiting to broad feature sets such as data analysis, sharing/collaboration, programmability, visualization). Usage of specific types of commands and usage of specific groups of commands from among multiple categories instead may provide a more realistic representation of individual user usage.

In further examples, categories of commands may be classified by user type (e.g., based on known demographics, type of business or consumer, type of license), based on operating system or platform, by geographical region, and the like. Also in further examples, the usage of commands may be tracked over time, such as in response to the release of new features. Also in further examples, the usage of the algorithm may be used to develop key measures and suggestions for user interface improvements, such as to indicate the commands and command sequences or command groups being commonly invoked by users.

Also in further examples, various user interface enhancements that are provided in response to the usage of clustered commands in a subject software application may be implemented by an add-on to the subject software application. Such user interface enhancements may also be embodied by additional server-based applications, features, or service offering, or changes to a license or feature package that is provided to a computing system or group of computing systems.

In a first use case example, various forms of in-application teaching and adaptation may be provided as a result of clustering user commands. For instance, an application can identify that if a certain user or type of user always performs a certain command, but not other commands that are commonly clustered that certain command, the user may not be aware on how to properly use the feature. Various forms of in-application user assistance and education may be used to offer suggestions based on this detected scenario.

In a second use case example, heuristic command and operation indication may be provided as a result of clustering user commands. For instance, when a user invokes a command by typing a certain formula into a spreadsheet, a dropdown list may present the next formula that is most likely to be used together with the current formula.

In a third use case example, user interface changes and refinement may be provided as a result of clustering user commands. For instance, this may include grouping the most frequently commands together on a user interface command group (e.g., ribbon) or other user interface component, to allow related commands to be surfaced to a user in a more visible and easy-to-access way.

In a fourth use case example, various automated search tool results and agent suggestions may be customized as a result of clustering user commands. For example, a command search user interface or agent interaction user interface may suggest and expose the commands and related commands in groups, to allow easy access for common actions performed by users.

Other use case examples to update or change a display of a software application or modify the technical operation of the software application may be implemented in accordance with the techniques discussed herein. In particular, other variations to change a presentation of a suggested command, or change a presentation of a user interface object, may occur in response to clustering of commands, and the performance of one or more commands within such clusters.

Figure 8:
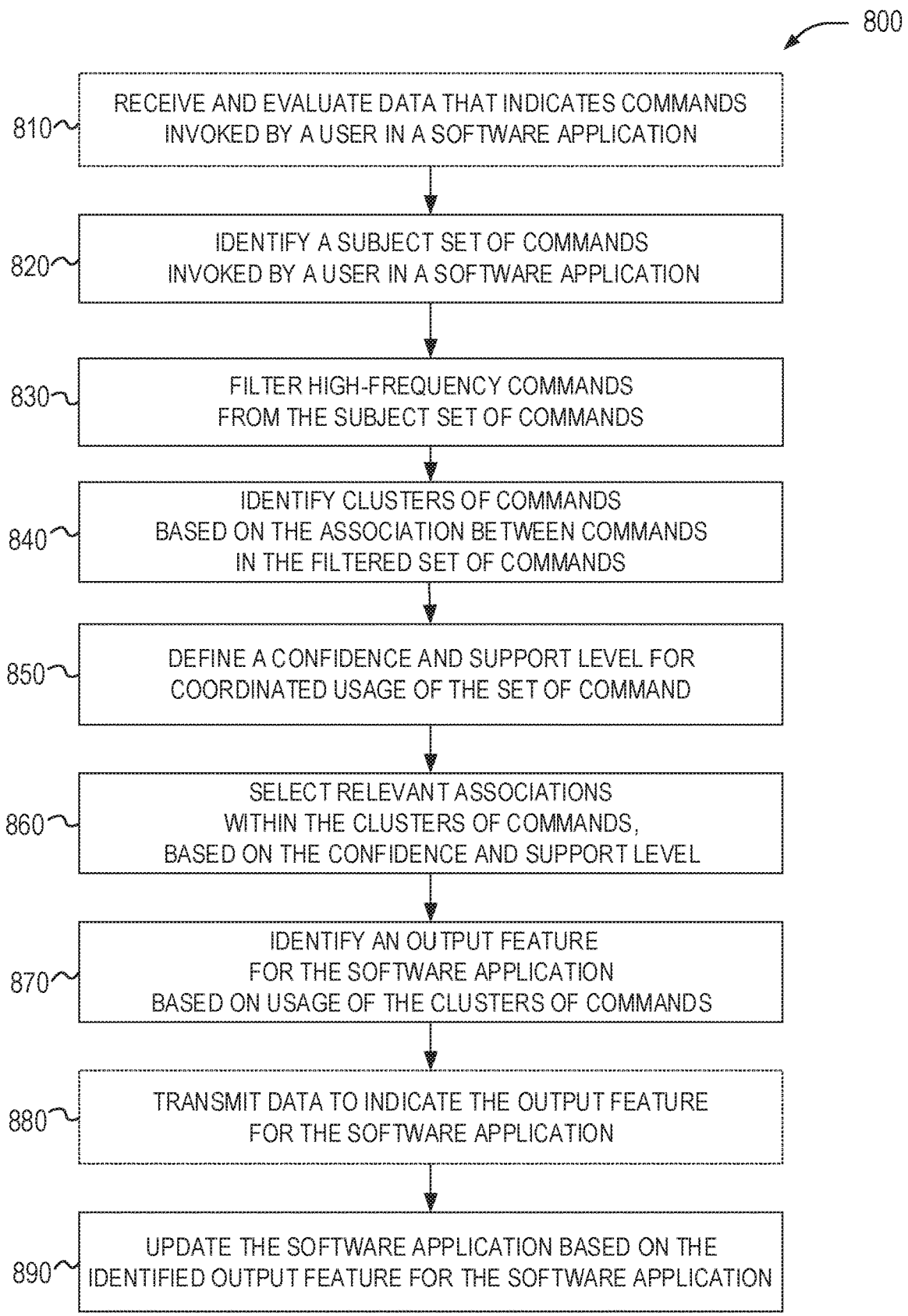
FIG. 8 illustrates a flowchart of a method for identifying and utilizing clusters of user interaction commands, according to an example.

FIG. 8 is a flowchart 800 of an example method for identifying and utilizing clusters of user interaction commands, according to an example. It will be understood that the operations of the flowchart 800 may be implemented in connection with a computer-implemented method, instructions on a computer program product, or on a configuration of a computing device (or among multiple of such methods, products, or computing devices). In an example, the electronic operations are performed by a computing device that operates as a server for hosting or coordinating operations for a client-accessible user interface; in another example, the electronic operations are performed within a client computing device that hosts a user interface.

As shown, the operations of the flowchart may commence to process data that identifies a set of commands, such as the receipt and evaluation of data that indicates that commands invoked by a user or group of users in a software application (operation 810). In an example, the data is received from a remote client computing device, and the data identifies the set of commands used in an instance of the particular software application operated on the remote computing device.

The operations of the flowchart continue to identify a subject set of commands invoked by a user in a software application (operation 820), which in some examples are invoked by interaction from a human user received in a graphical user interface of the software application. In an example, the subject set of commands are filtered, to exclude commands in the software application that are used above a predefined frequency (operation 830). Based on the identification and evaluation of the subject set of commands, a coordinated usage of respective commands of the set of commands may be identified. This coordinated usage may be based on a sequence of commands performed in a defined order, or commands that are jointly performed within a defined amount of time.

The operations of the flowchart continue to identify a cluster of commands based on the association between commands (and the coordinated usage of such commands) among the respective commands of the filtered set of commands (operation 840). As noted above, the cluster of commands may represent a sequence of commands performed in a defined order or within a defined amount of time.

The cluster of commands may be further refined (e.g., expanded, contracted, modified) by selection of associations within the cluster of commands based on relevancy (operation 860). In an example, the relevancy of associations within the cluster is determined for a respective cluster from clustering parameters, such as a calculated confidence value and a calculated support level value (operation 850). In a further example, the confidence value and the support level value is calculated for the respective cluster based on usage of a particular command of the set of commands. In still a further example, the calculated confidence value for association of the particular command with another command is based on a ratio of a number of times the particular command is used with the another command relative to a total number of occurrences of the particular command, and the calculated support level value for the particular command is based on a ratio of a number of occurrences of the particular command relative to a total number of commands.

The operations of the flowchart conclude to identify an output feature for the software application, based on usage of the cluster of commands (operation 870). In an example, the output feature is identified based on a rule set or data definition that associates the use of certain clusters of commands for certain output features. For instance, a graphical user interface control may be made available (shown, unlocked, presented) in response to the usage of the certain clusters of commands. In an optional example, data to indicate the output feature may be transmitted to the software application (e.g., communicated via an application programming interface to an instance of the software application at a local computing device, communicated to another software application operating at a remote computing device, etc.) (operation 880). In a further example, the output feature in the software application includes: a presentation of a suggested command, or a change to a presentation of a user interface object, in response to the cluster of commands. Based on the indication, a feature in the software application may be updated (e.g., changed, modified, removed, added, etc.) (operation 890). In an example, this update includes an update of a display of the software application, to correspond to the indicated output feature.

As an example of a cluster of a first command and a second command, the set of filtered commands includes at least a first command and a second command, and coordinated usage of the first command and the second command is established from usage of the second command subsequent to usage of the first command. In this example, the particular cluster is part of a plurality of clusters of commands, and the particular cluster includes an association between the first command and at least the second command, and an output feature is based on the second command.

The example operations of flowchart 800 may be performed at or among a client or server computing device. In an example, the software application is adapted to execute on the local computing device with use of a processor and a memory device. In another example, the software application is adapted to execute on a client computing device, with the data communicated to a server computing device.

Although many of the examples provided above reference the use of graphical user interface software such as productivity software and web browsers, it will be understood that the techniques discussed herein may adapted to commands and actions performed other types of software environments beyond standard graphical user interfaces. These may include human-machine interactions in recommend engines, actions performed in virtual reality or augmented reality environments, interaction features in operating systems, and the like. Further, it will be understood that any number of input mechanisms may be invoked by users in varying conditions and environments to activate or control a command, feature, or other functionality of the software application.

Figure 9:
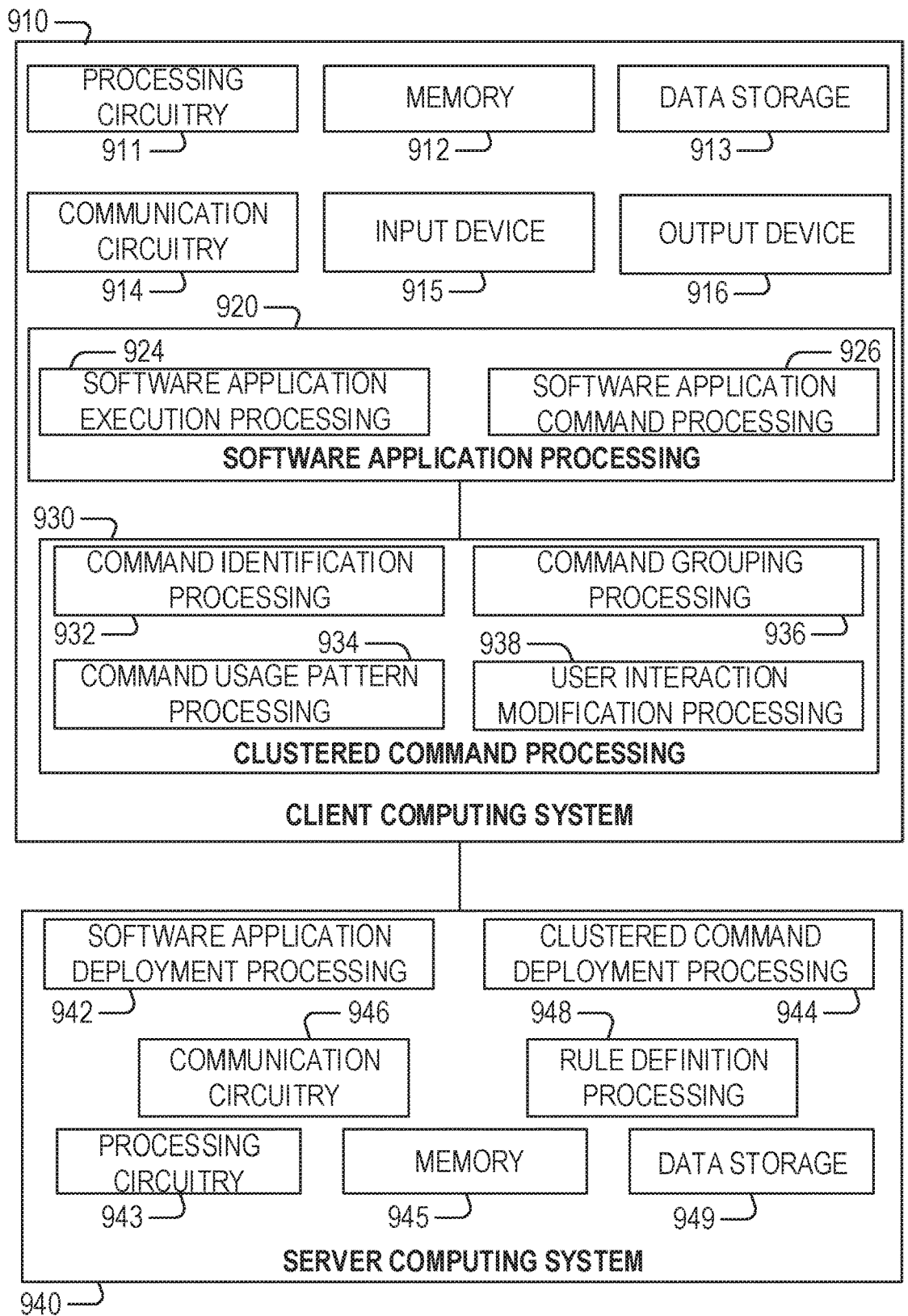
FIG. 9 illustrates a block diagram of hardware and functional components of client and server computing systems to implement operations that identify and utilize clusters of user interaction commands, according to an example.

FIG. 9 illustrates a block diagram 900 of hardware and functional components of a client computing system 910 and a server computing system 940 to implement operations that identify and utilize clusters of user interaction commands, such as are accomplished with the examples described above. It will be understood, that although certain hardware and functional components are depicted in FIG. 9 and in other drawings as separate systems or services, the features of the components may be integrated into a single system or service (e.g., in a single computing system, including the user interface and also including user interface data clustering features). Further, although only one client computing system and one server computing system is configured, it will be understood that the features of these systems may be distributed among one or multiple computing systems (including in cloud-based processing settings).

As shown, the client computing system 910 includes processing circuitry 911 (e.g., a CPU) and a memory 912 (e.g., volatile or non-volatile memory) used to perform electronic operations (e.g., via instructions) for clustering and analysis of commands in a user interface of a subject software application (e.g., to implement the techniques depicted in FIGS. 1-8) and execution of the subject software application; data storage 913 to store commands, instructions, and other data for operation and use of the clustering and analysis operations; communication circuitry 914 to communicate with an external network or devices via wired or wireless networking components for the clustering and analysis operations; an input device 915 (e.g., an alphanumeric, point-based, tactile, audio input device) to receive input from a human user; and an output device 916 (e.g., visual, acoustic, haptic output device) to provide output to the human user.

In an example, the client computing system 910 is adapted to execute the subject software application, through software application processing components or functionality 920 (e.g., circuitry or software instructions), such as through software application execution processing or functionality 924 used to operate the subject software application; and software application command processing or functionality 926 (e.g., circuitry or software instructions) used to receive and implement commands within the subject software application. Although FIG. 9 depicts the execution of the software application occurring on the client computing system 910, it will be understood that the software application may be executed on other computing systems, including multiple computing systems as orchestrated in a server-based deployment of software from the server computing system 940.

In an example, the client computing system 910 is adapted to implement clustered command processing components or functionality 930, through respective features including: command identification processing or functionality 932 (e.g., circuitry or software instructions) used to process data that identifies commands used in a subject software application; command usage pattern processing or functionality 934 (e.g., circuitry or software instructions) used to identify coordinated usage of respective commands in the subject software application; command grouping processing or functionality 936 (e.g., circuitry or software instructions) used to identify clusters of commands and associations within the clusters of commands; and user interaction modification processing or functionality 938 (e.g., circuitry or software instructions) used to indicate and implement an output feature in the subject software application.

As shown, the server computing system 940 includes processing circuitry 943 (e.g., a CPU) and a memory 945 (e.g., volatile or non-volatile memory) used to perform electronic operations (e.g., via instructions) for clustering and analysis of commands in the subject software application (e.g., to implement the techniques depicted in FIGS. 1-8) and coordination of features for the subject software application; data storage 949 to store commands, instructions, and other data for operation and use of the clustering and analysis operations; and communication circuitry 946 to communicate with an external network or devices via wired or wireless networking components for the clustering and analysis operations. In an example, the server computing system 940 is adapted to coordinate the collection of data or execution of the software application through respective features including: software application deployment processing or functionality 942 (e.g., circuitry or software instructions) used to coordinate or monitor deployment of a software application among respective client computing devices; clustered command deployment processing 944 (e.g., circuitry or software instructions) used to coordinate or monitor use of commands and clusters of commands among respective client computing devices; and rule definition processing or functionality 948 (e.g., circuitry or software instructions) used to coordinate or monitor processing actions for clusters of commands or user interface modifications in response to clusters of commands among respective client computing devices. Other aspects may be performed by the server computing system 940 to implement the techniques discussed herein in a server-coordinated or server-controlled environment.

As referenced above, the embodiments of the presently described electronic operations may be provided in machine or device (e.g., apparatus), method (e.g., process), or computer- or machine-readable medium (e.g., article of manufacture or apparatus) forms. For example, embodiments may be implemented as instructions stored on a machine-readable storage medium, which may be read and executed by a processor to perform the operations described herein. A machine-readable medium may include any non-transitory mechanism for storing information in a form readable by a machine (e.g., a computer). A machine-readable medium may include a single medium or multiple media (e.g., a centralized or distributed database, and/or associated caches and servers) that store the one or more instructions.

A machine-readable medium may include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. A machine-readable medium shall be understood to include, but not be limited to, solid-state memories, optical and magnetic media, and other forms of storage devices. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and optical disks. The instructions may further be transmitted or received over a communications network using a transmission medium (e.g., via a network interface device utilizing any one of a number of transfer protocols.

Although the present examples refer to various forms of cloud services and infrastructure service networks, it will be understood that may respective services, systems, and devices may be communicatively coupled via various types of communication networks. Examples of communication networks include a local area network (LAN), a wide area network (WAN), the Internet, mobile telephone networks, plain old telephone (POTS) networks, and wireless data networks (e.g., Wi-Fi, 2G/3G, and 4G LTE/LTE-A, or other personal area, local area, or wide area networks).

Embodiments used to facilitate and perform the electronic operations described herein may be implemented in one or a combination of hardware, firmware, and software. The functional units or capabilities described in this specification may have been referred to or labeled as components, processing functions, or modules, in order to more particularly emphasize their implementation independence. Such components may be embodied by any number of software or hardware forms. For example, a component or module may be implemented as a hardware circuit comprising custom circuitry or off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. The executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as the command and control service) may take place on a different processing system (e.g., in a computer in a cloud-hosted data center), than that in which the code is deployed (e.g., in a test computing environment). Similarly, operational data may be included within respective components or modules, and may be embodied in any suitable form and organized within any suitable type of data structure. The operational data may be collected as a single data set, or may be distributed over different locations including over different storage devices.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. A computing device, comprising:
   a processor; and
   a memory device including instructions embodied thereon, wherein the instructions, which when executed by the processor, configure the processor to perform electronic operations comprising:
      processing data that identifies a set of commands used in a software application;
      identifying coordinated usage of respective commands of the set of commands;
      identifying a cluster of commands based on the coordinated usage among the respective commands of the set of commands;
      defining associations within the cluster of commands based on relevancy, the relevancy being determined for a respective cluster from a confidence value for association of a particular command with another command and a support level value, the confidence value being calculated based on a ratio of a number of times the particular command is used with the another command relative to a total number of occurrences of the particular command, and the support level value for the particular command being calculated based on a ratio of a number of occurrences of the particular command relative to a total number of commands; and
      identifying an output feature in the software application based on the cluster of commands.

2. The computing device of claim 1, wherein the set of commands used in the software application are invoked by interaction from a human user received in a user interface of the software application.

3. The computing device of claim 1, wherein operations to process data that identifies the set of commands used in the software application include operations to exclude commands in the software application that are used above a predefined frequency.

4. The computing device of claim 1, wherein the cluster of commands represents a sequence of commands performed in a defined order or within a defined amount of time.

5. The computing device of claim 1, wherein the set of commands includes at least a first command and a second command, coordinated usage of the first command and the second command being established from usage of the second command subsequent to usage of the first command, the cluster of commands including association between the first command and at least the second command, and the output feature being based on the second command.

6. The computing device of claim 1, wherein the output feature in the software application includes a presentation of a suggested command, or a change to a presentation of a user interface object, in response to the cluster of commands.

7. The computing device of claim 1, wherein the memory device includes further instructions that when executed by the processor perform further electronic operations comprising updating a display of the software application based on the identified output feature, the software application being adapted to execute on the computing device with use of the processor and the memory device.

8. The computing device of claim 1, wherein the memory device includes further instructions that when executed by the processor perform further electronic operations comprising:
   receiving data, from a remote client computing device, that identifies the set of commands used in the software application; and
   transmitting data, to the remote client computing device, that indicates the output feature in the software application, the software application being adapted to execute on the remote client computing device.

9. A non-transitory device-readable storage medium, the device-readable storage medium including instructions that, when executed by a processor and memory of a computing device, causes the computing device to perform operations comprising:
   processing data that identifies a set of commands used in a software application;
   identifying coordinated usage of respective commands of the set of commands;
   identifying a cluster of commands based on the coordinated usage among the respective commands of the set of commands;
   defining associations within the cluster of commands based on relevancy, the relevancy being determined for a respective cluster from a confidence value for association of a particular command with another command and a support level value, the confidence value being calculated based on a ratio of a number of times the particular command is used with the another command relative to a total number of occurrences of the particular command, and the support level value for the particular command being calculated based on a ratio of a number of occurrences of the particular command relative to a total number of commands; and identifying an output feature in the software application based on the cluster of commands.

10. The device-readable storage medium of claim 9, wherein operations to process data that identifies the set of commands used in the software application includes operations to exclude commands in the software application that are used above a predefined frequency, the set of commands used in the software application being invoked by interaction from a human user received in a user interface of the software application.

11. The device-readable storage medium of claim 9, wherein the cluster of commands represents a sequence of commands performed in a defined order or within a defined amount of time.

12. A method comprising a plurality of electronic operations executed with a processor and memory of a computing device, the plurality of electronic operations including:

processing data that identifies a set of commands used in a software application;

identifying coordinated usage of respective commands of the set of commands;

identifying a cluster of commands based on the coordinated usage among the respective commands of the set of commands;

defining associations within the cluster of commands based on relevancy, the relevancy being determined for a respective cluster from a confidence value for association of a particular command with another command and a support level value, the confidence value being calculated based on a ratio of a number of times the particular command is used with the another command relative to a total number of occurrences of the particular command, and the support level value for the particular command being calculated based on a ratio of a number of occurrences of the particular command relative to a total number of commands; and identifying an output feature in the software application based on the cluster of commands.

13. The method of claim 12, wherein processing data that identifies the set of commands used in the software application includes operations to exclude commands in the software application that are used above a predefined frequency, the set of commands used in the software application being invoked by interaction from a human user received in a user interface of the software application.

14. The method of claim 12, wherein the cluster of commands represents a sequence of commands performed in a defined order or within a defined amount of time.

* * * * *